US011507716B2

(12) United States Patent
Yokoyama et al.

(10) Patent No.: US 11,507,716 B2
(45) Date of Patent: Nov. 22, 2022

(54) PREDICTING LIFE EXPECTANCY OF MACHINE PART

(71) Applicant: International Business Machines Corporation, Armonk, NY (US)

(72) Inventors: Michihiro Yokoyama, Chikasaki (JP); Junya Shimizu, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1054 days.

(21) Appl. No.: 16/029,697

(22) Filed: Jul. 9, 2018

(65) Prior Publication Data
US 2020/0012753 A1  Jan. 9, 2020

(51) Int. Cl.
G06F 30/20 (2020.01)
G06N 3/08 (2006.01)
G06N 3/04 (2006.01)

(52) U.S. Cl.
CPC ........... *G06F 30/20* (2020.01); *G06N 3/0472* (2013.01); *G06N 3/08* (2013.01)

(58) Field of Classification Search
CPC ......... G06F 30/20; G06N 3/0472; G06N 3/08
See application file for complete search history.

(56) References Cited

U.S. PATENT DOCUMENTS

| 2012/0143567 A1 | 7/2012 | Fourie |
| 2014/0156225 A1 | 5/2014 | Dagnino et al. |
| 2014/0200952 A1 | 7/2014 | Hampapur et al. |

FOREIGN PATENT DOCUMENTS

WO  WO2016196775 A1  8/2016

OTHER PUBLICATIONS

Houman Hanachi, Christopher Mechefske, Jie Liu, Avisekh Banerjee, and Ying Chen. Performance-Based Gas Turbine Health Monitoring, Diagnostics, and Prognostics: A Survey. May 2018. IEEE (Year: 2018).*
Alireza Farhangfar, Lukasz A. Kurgan, Member, IEEE, and Witold Pedrycz. A Novel Framework for Imputation of Missing Values in Databases. Sep. 2007. IEEE (Year: 2007).*
M.A.Herzog, T.Marwala, P.S.Heyns. Machine and component residual life estimation through the application of neural networks. 2009. Elsevier. (Year: 2009).*
P. Mell, et al. *"The NIST Definition of Cloud Computing"*, NIST Special Publication 800-145, Sep. 2011, Gaithersburg, MD.

* cited by examiner

*Primary Examiner* — Alexey Shmatov
*Assistant Examiner* — Robert Bejcek, II
(74) *Attorney, Agent, or Firm* — Stephanie Carusillo; George S. Blasiak; Heslin Rothenberg Farley & Mesiti PC

(57) ABSTRACT

Methods, computer program products, and systems are presented. The methods include, for instance: obtaining service life data of a part including a maintenance operation count of the part. The life expectancy of the part is formulated as a function of a life span of the part and the maintenance operation count at a point in time based on the obtained service life data and data interpolated therefrom. A life expectancy model is built based on the function and a plurality of life expectancies are predicted by applying simulated inputs to the life expectancy model. The life expectancies are produced after verification to indicate when to replace the part.

20 Claims, 8 Drawing Sheets

PREDICTING LIFE EXPECTANCY OF MACHINE PART

TECHNICAL FIELD

The present disclosure relates to time series modeling and machine learning technology, and more particularly to methods, computer program products, and systems for predicting life expectancy of parts in machinery.

BACKGROUND

Conventionally, approaches for predicting failures in machine parts are based on reliability engineering, which utilizes failure data that had been sufficiently measured during a design-phase testing of equipment including a subject part in a testing environment. Such approaches include obtaining a failure probability density function which takes the deviation in the number of failure occurrences into account using Weibull distribution, as well as obtaining a failure probability that depends on the operation time of a part subject to the failure analysis. Further, building a parametric model that approximates the probability density function according to the failure data characteristics in place of the Weibull distribution can also be applicable for obtaining the failure probability.

SUMMARY

The shortcomings of the prior art are overcome, and additional advantages are provided, through the provision, in one aspect, of a method. The method for predicting a life expectancy of a part includes, for instance: obtaining, by one or more processor, service life data of the part, where the service life data include a maintenance operation count of the part; creating, by the one or more processor, by use of a neural network, a life expectancy (LE) model predicting the life expectancy of the part as a function of a life span of the part and the maintenance operation count at a point in time, based on the obtained service life data and data interpolated therefrom; verifying, by the one or more processor, the created LE model by comparing a plurality of life expectancies with observed service life data, wherein the life expectancies are predicted by the LE model based on simulated intervals and simulated maintenance operation counts; and producing, by the one or more processor, the predicted life expectancy from the verifying for use, where the predicted life expectancy indicates when to replace the part in order to ensure a continuous operation utilizing the part.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
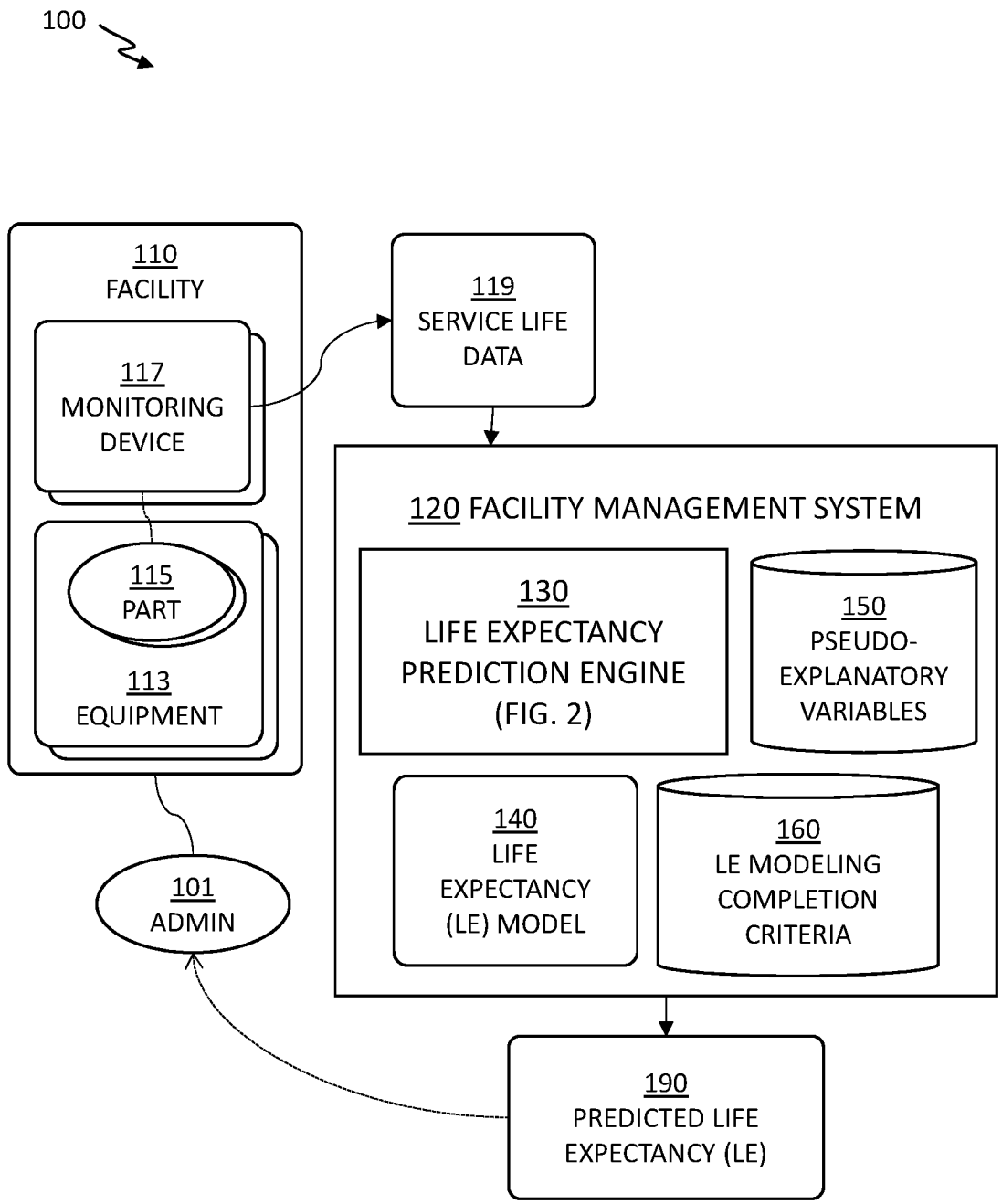
FIG. 1 depicts a system 100 for predicting life expectancies for a machine part, in accordance with one or more embodiments set forth herein.

FIG. 1 depicts a system 100 for predicting life expectancies for a machine part, in accordance with one or more embodiments set forth herein.

One of goals for the analytics in the field of manufacturing industry is to improve efficiency of maintenance so that a manufacturing facility can operate without unexpected stoppages. Predicting replacement time of respective parts with reasonable accuracy would enable scheduling timely replacements of parts, and accordingly, can ensure continuous operation of the manufacturing facility.

Embodiments of the present invention recognizes that, in conventional facility management practices, parts in machine/equipment of a facility are replaced once the parts become nonfunctional and/or expire after a certain period of expected service life. Such management practices, however, can cause an unexpected stoppage in operations of equipment, to which a broken part belongs, and, accordingly, can also cause a halt of operations in a facility, based on the role of the equipment in a production line of the facility. Embodiments of the present invention also recognizes that, some efforts are made to minimize such unexpected halt of work operation in the facility by maintenance schedules ahead of the actual expiration of parts. Embodiments of the present invention also recognizes that conventional prediction of replacement time of parts in equipment based on a conventional probabilistic distribution is limited with accuracy, and accordingly, can not maximize the usage of the replaced parts. Embodiments of the present invention further recognized that conventional prediction methods require a significant amount of service data for the part, which is often not available from monitoring equipment of certain facilities.

The system 100 includes a facility 110 and a facility management system 120 for the facility 110. The facility 110 can be, for example, a manufacturing facility. One or more equipment 113 operates in the facility 110, in order to keep the facility 110 functional, such as production equipment. One or more monitoring device 117 monitors operations of the each equipment 113 and generates service life data 119 corresponding respective to each part 115 in the equipment 113, where the service life data 119 include a maintenance operation count of each part 115.

The part 115 of the equipment 113 is functional for a period of time referred to as a life span. The part 115 should be replaced, prior to or upon expiration of, the life span to keep the equipment 115 functional. In this specification, the life span of the part 115 is measured as a total number of maintenance operations performed, or expected to be performed, on the part 115 during the service life of the part 115 until being replaced, denoted as T. Also in this specification, a point in time p, upon which a remaining service life, referred to as a life expectancy, of the part 115 is predicted, is measured as a number of accumulated maintenance operations performed on the part 115 up to the point of time, denoted as MO(p). In this specification, a maintenance operation is performed upon an alert of certain malfunction/anomaly applicable to the part 115 has been detected, and then the MO of the part 115 is increased and recorded into the service life data 119.

An admin 101 of the facility 110 would be responsible for keeping the equipment 113 and the part 115 operational, including timely replacing the part 115 in the equipment 113. In this specification, the term "part" is used to represent a component of the equipment 113. Few examples of the part 115 can include, but are not limited to, a traveling inverter, a traveling brake, a laterally moving chain, an elevating wire rope, or the like. In the context of replacement time of the part 115, where the part 115 is integral to the equipment 113 to which the part 115 belongs, replacing the part 115 can implicate the replacement of the equipment 113.

The facility management system 120 produces a predicted life expectancy (LE) 190 of the part 115 based on the service data 119. The facility management system 120 provides the predicted life expectancy 190 of the part 115 to the admin 101, in order to facilitate a timely replacement of the part 115 according to the predicted LE 190.

Conventional approaches for predicting failures in machine parts are based on reliability engineering, which utilizes failure data that had been sufficiently measured during a design-phase testing of equipment including a subject part in a testing environment. Such approaches include obtaining a failure probability density function which takes the deviation in the number of failure occurrences into account using Weibull distribution, as well as obtaining a failure probability that depends on the operation time of a part subject to the failure analysis. Further, building a parametric model that approximates the probability density function according to the failure data characteristics in place of the Weibull distribution can also be applicable for obtaining the failure probability.

However, the conventional failure prediction methods are not accurate in predicting a failure of the part in an operating environment in which the part actually performs normal operations, because anomalies and failures that occur in the operating environment for a part modeled for the failure prediction are not necessarily the same as what had been observed and measured during the design-phase testing. Particularly, the part fails more frequently in the testing environment, by design, than in the actual operating environment. Accordingly, the failure data sampled during the design-phase testing are not suitable for modeling life expectancy of the part based on deterioration in the operating environment. Conversely, obtaining enough failure data for deterioration-based life expectancy modeling by monitoring the part in the operating environment would be difficult, if possible, because it takes significant amount of time to gather enough failure data for the part as working in the operating environment, and also because, during such long sampling period, the failure probability density function behind the deterioration model is likely to change.

The facility management system 120 includes a life expectancy prediction engine 130, which creates a life expectancy (LE) model 140 by use of service life data 119. The life expectancy prediction engine 130 determines that the LE model 140 is usable for prediction upon ascertaining that the predicted life expectancy meets LE modeling completion criteria 160. The life expectancy prediction engine 130 subsequently generates pseudo-explanatory variables 150 for predicting a life expectancy by use of the LE model 140. The life expectancy prediction engine 130 further verifies the life expectancy by use of observed service life data 119, and then produces the life expectancy based on the LE model 140 as the predicted LE 190. By generating the LE model 140 based on the service life data 119 of limited amount as gathered by the monitoring device 117, and then later generating the pseudo-explanatory variables 150, the life expectancy prediction engine 130 enables predicting life expectancies more accurate than conventional probability models across the testing environment and the operating environment. Detailed operations of the life expectancy prediction engine 130 are presented in FIGS. 2, 3, and 4, and corresponding descriptions.

Figure 2:
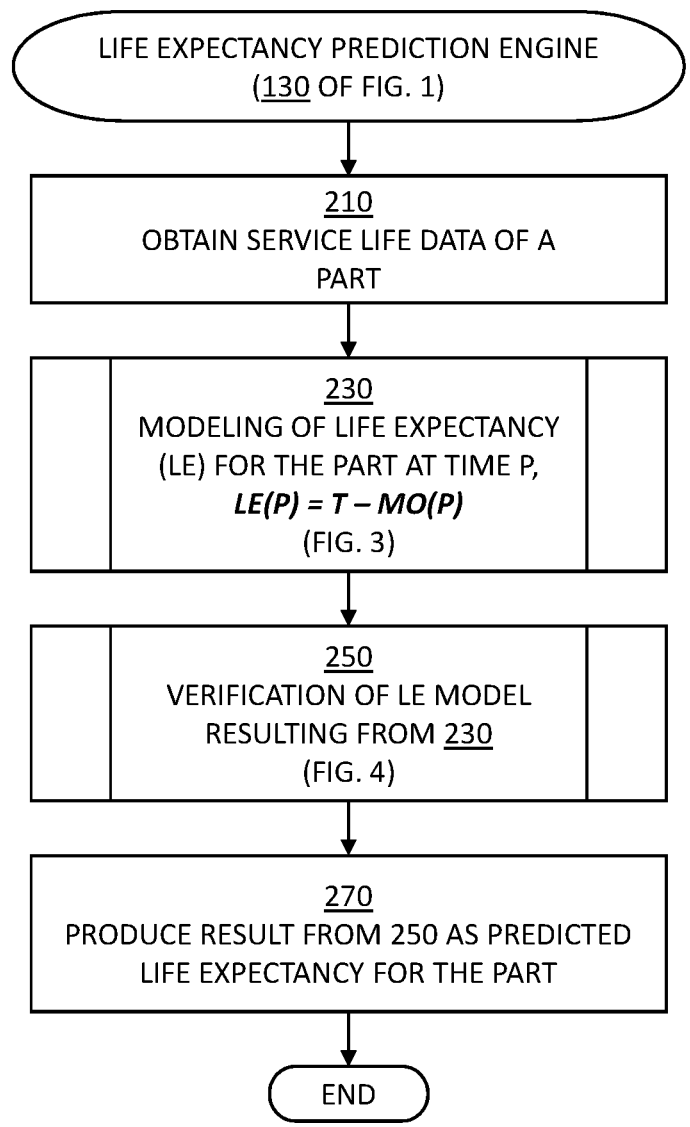
FIG. 2 depicts a flowchart of operations performed by the life expectancy prediction engine, in accordance with one or more embodiments set forth herein.

FIG. 2 depicts a flowchart of operations performed by the life expectancy prediction engine 130, in accordance with one or more embodiments set forth herein.

In block 210, the life expectancy prediction engine 130 obtains the service life data 119 of the part 115 subject to the life expectancy prediction by the life expectancy prediction engine 130. The part 115 is noted as Part 115 hereinafter. Then the life expectancy prediction engine 130 proceeds with block 230.

In block 230, the life expectancy prediction engine 130 creates a life expectancy (LE) model for the Part 115 at time p, based on the service life data 119 received from block 210. The life expectancy prediction engine 130 formulates the life expectancy model, which predicts when the Part 115 would expire, and accordingly, when to replace the Part 115, as a function of a total number of maintenance operations during the lifetime of the Part 115 and a number of maintenance operations accumulated up to a point during the lifetime as below.

$$LE(p)=T-MO(p),$$

where LE(p) indicates a remaining life expectancy of the Part 115 at time p, T indicates the total number of maintenance operations during the lifetime of the Part 115, and MO(p) indicates a number of maintenance operations accumulated during the service life of the Part 115 at time p. Detailed operations of block 230 are presented in FIG. 3 and corresponding description. Then the life expectancy prediction engine 130 proceeds with block 250.

In block 250, the life expectancy prediction engine 130 verifies the LE model generated from block 230 and predicts the life expectancy, that is, the replacement time, of the Part 115 by use of the verified LE model. In this specification, terms "remaining service life", "life expectancy", and "replacement time" are used interchangeably. Detailed operations of block 250 are presented in FIG. 4 and corresponding description. Then the life expectancy prediction engine 130 proceeds with block 270.

In block 270, the life expectancy prediction engine 130 produces the result from block 250 as the predicted life expectancy 190 for the Part 115 to the admin 101 of the facility 110. Then the life expectancy prediction engine 130 terminates processing. In the alternative, the life expectancy prediction engine 130 proceeds with predicting respective life expectancies of other instances of the Part 115.

Figure 3:
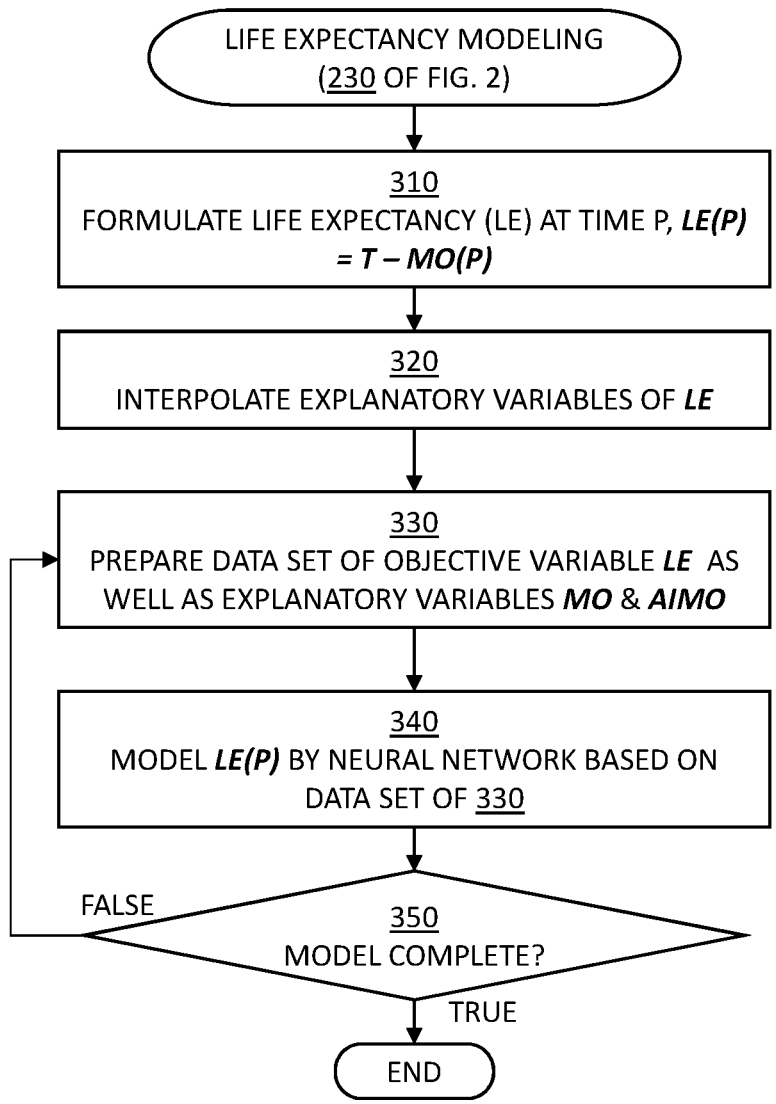
FIG. 3 depicts a flowchart of operations for life expectancy modeling in block 230 performed by the life expectancy prediction engine, in accordance with one or more embodiments set forth herein.

FIG. 3 depicts a flowchart of operations for life expectancy modeling in block 230 performed by the life expectancy prediction engine 130, in accordance with one or more embodiments set forth herein.

In block 310, the life expectancy prediction engine 130 formulates a life expectancy (LE) prediction model for the Part 115 at time p.

$$LE(p)=T-MO(p)$$

As noted, the life expectancy at time p (LE(p)) is an objective variable to be predicted, depending on the total number of maintenance operations during the lifetime of the Part 115 (T), and the number of maintenance operations accumulated during the service life of the Part 115 at time p (MO(p)). LE(p) is a time series data determined by T and MO(p), as well as the average interval between two consecutive maintenance operations. Then the life expectancy prediction engine 130 proceeds with block 320.

An explanatory variable for the LE(p) is T representing the total number of maintenance operations during the lifetime of the Part 115. The value of T is determined by monitoring instances of the Part 115 during the respective service lives of the instances. In certain embodiments of the present invention, the value of T can be calculated as an average of the observed durations of the service lives of instances of the Part 115. Because the lifetime of the Part 115 T is formulated as the total numbers of maintenance operations, the average length of an interval between two consecutive maintenance operations would determine a period of time corresponding to the service life. The instances of the Part 115 can have distinctive lengths of service lives depending on, for example, when a specific instance of the Part 115 had been put into service, and/or how an equipment to which an instance of the Part 115 is part is configured for a service operation.

Another explanatory variable for the LE(p) is a probabilistic variable MO(p) representing the number of maintenance operations accumulated during the service life of the Part 115 at time p. MO(p) fluctuates depending on the working condition of instances of the Part 115. Accordingly, the interval between two (2) consecutive maintenance operations will be different for each time a maintenance operation is observed, as MO(p) varies depending on time. In certain embodiments of the present invention, the life expectancy prediction engine 130 sets an average interval between maintenance operations, based on the assumption that the Part 115 operates under a normal working condition.

Time p can be represented in the monitoring index for the maintenance operations, indicating a counter for the maintenance operations, assuming the intervals between two consecutive maintenance operations are uniform.

For example, if the Part 115 has fifty total maintenance operations as an average life expectancy (T=50), after 10 maintenance operations has been performed (p=10, MO(p)= 10), an instance of the Part 115 would be predicted to have 40 more maintenance operations left as the remaining life expectancy, also referred to as a replacement time, LE(10)= 40.

In block 320, the life expectancy prediction engine 130 interpolates explanatory variables of the life expectancy LE(p). Because the time series of the life expectancy varies due to stochastic variations in the individual intervals between two consecutive maintenance operations, a Maintenance Operation Monitoring Index (MOMI) of each maintenance operation is counted at the same time as the life expectancy based on assuming an Average Interval between Maintenance Operations (AIMO), that is, LE(p)=f:(AIMO, MOMI)=T−MO(p). In this specification, the MOMI can be used interchangeably with the terms "index of maintenance operations", "count of maintenance operations", "number of maintenance operations", and also "point of time" because the time lapse is measured in the number of maintenance operations. Also in this specification, the AIMO can be referred to as "interval". The service life data 119 as monitored can not be available at every certain unit of time period during the monitored service life, and accordingly, the life expectancy prediction engine 130 interpolates the explanatory variables. Then the life expectancy prediction engine 130 proceeds with block 330.

In one embodiment of the present invention, where the service life data 119 is not continuous, the life expectancy prediction engine 130 utilizes one or more interpolation method of: 1) by substituting the service life data 119 with samples from other period of time that has a similar maintenance operation pattern; 2) by extending a sampling time period to another time period in which no service life data 119 is available; and 3) by assuming that maintenance operations have been consistently performed at average intervals.

In block 330, the life expectancy prediction engine 130 prepares a data set for the objective variable LE(p) as well as the explanatory variables MO(p) and AIMO, as a learning data set for the LE model 140. Then the life expectancy prediction engine 130 proceeds with block 340.

In block 340, the life expectancy prediction engine 130 models the life expectancy as formulated the objective variable LE(p) in relation to the explanatory variables MO(p) and AIMO by use of a machine learning device such as a neural network. As the life expectancy model predicts remaining life expectancy at a certain time for the modeled Part 115, LE(p) is also an indicator of when to replace the Part 115. Then the life expectancy prediction engine 130 proceeds with block 350.

In certain embodiments of the present invention, the life expectancy prediction engine 130 preprocesses the data set by using decision tree analysis or the like, in order to expedite the learning process of the non-linear relations between the explanatory variables, MO(p) and AIMO, and the objective variable, LE(p).

In block 350, the life expectancy prediction engine 130 determines whether or not the LE model 140 built from block 340 is complete for predicting the life expectancy. If the life expectancy prediction engine 130 determines that the LE model 140 is complete, then the life expectancy prediction engine 130 proceeds with block 250 of FIG. 2. If the life expectancy prediction engine 130 determines that the LE model 140 is not complete, then the life expectancy prediction engine 130 loops back to block 330 in order to prepare another data set for another round of LE modeling.

In certain embodiments of the present invention, the life expectancy prediction engine 130 assesses the completeness of the LE model 140 generated by the neural network based on one or more condition of the LE model 140, in comparison with other LE models and/or the service life data 119 as observed. Because the number of samples in the data set from block 330 is likely to be limited and the curves of the life expectancy LE(p) vary across various operating environments, the life expectancy prediction engine 130 can not be able to obtain sufficiently converged model parameters from the data set that is used as learning sample for the neural network, even if the life expectancy prediction engine 130 employs a learning technique for a limited number of samples such as boosting.

In the same embodiments of the present invention as above, the one or more condition of the LE model 140 by which the life expectancy prediction engine 130 determines the completeness of the LE model 140 is selected from: Condition 1) the gradient of the curve of the LE model 140 is appropriate, that is the gradient of the curve of the LE model 140 decreases in a linear and/or non-linear manner; Condition 2) neither reverse flow, indicating the LE increases over time, nor zero-gradient, indicating the LE stays the same over time, is present; Condition 3) the LE can be calculated within a margin of error acceptable for the prediction; and Condition 4) noises of the service life data 119 are suppressed.

In the same embodiments of the present invention as above, with respect to Conditions 1 and 2, the life expectancy prediction engine 130 determines that the gradient of the curve of the LE model 140 is appropriate if the gradient of the curve of the LE model 140 is within a margin of error from a linear reference graph, and the gradient is no greater than or equal to zero (0). As noted above, the gradient zero (0) indicates the remaining life expectancy stays the same over time as the number of accumulated maintenance operations (p) increases, which is inconsistent to a basic assumption of a life expectancy as continuously declining. Also noted is that a positive gradient is not permissible under the same basic assumption, because the positive gradient implicates that the remaining life expectancy increases over time even though the number of accumulated maintenance operations (p) increases. Further, the life expectancy prediction engine 130 determines that the gradient of the curve of the LE model 140 is appropriate if the gradient is reversely proportional to an observed life span of the Part 115, indicating that the shorter the life span of a part, the steeper the gradient of the curve for an LE model corresponding to the part.

In the same embodiments of the present invention as above, with respect to Condition 3, the life expectancy prediction engine 130 determines that the LE model 140 is complete if the LE can be calculated within the margin of error acceptable for the prediction, denoted as $k\sigma$, where $\sigma$ indicates the standard deviation of the data set from block 330 used as training data for the LE model 140, and where k is determined by $P(|LE(p)-LS| \le k\sigma) \le 1/k^2$, $k \ge 1$, $P(x)$ indicates a probability of a variable x, $LE(p)$ indicates a predicted life expectancy by use of the LE model 140 for the Part 115 at time p, and LS indicates a life span of the Part 115 as observed from the service life data 119. Accordingly, the life expectancy prediction engine 130 determines the LE model 140 is complete if the predicted life expectancy is close to zero (0) when the prediction was performed at the end phase of the service life of the Part 115, indicating that the LE model 140 is usable for predicting a replacement time for the Part 115. The end phase of the service life of the Part 115 can be determined as a time period within a margin of error from the actual life span of the Part 115 as observed from the service life data 119. Because it is impractical, if not impossible, to attain the LE model 140 to predict an exact life expectancy at every stage of the service life, the life expectancy prediction engine 130 employs the margin of error acceptable for the prediction $k\sigma$:

The life expectancy prediction engine 130 can employ varying weights to the MOMIs to produce a result similar to the margin of error acceptable for the prediction $k\sigma$. For example, the life expectancy prediction engine 130 can assign a certain weight for MOMIs within a certain range of the observed life span, then adjust the LE model 140 by decreasing the life expectancies predicted for the weighted MOMIs to zero (0).

In the same embodiments of the present invention as above, with respect to Condition 4, the life expectancy prediction engine 130 determines that the LE model 140 is complete if noises in the observed service life data 119 are suppressed. Where the noises, or fluctuations, in the observed service life data 119 are within a noise threshold range from the LE model 140, the life expectancy prediction engine 130 determines that the LE model 140 is complete. The noise threshold range can be determined as a difference between the life expectancy predicted by the LE mode (0) 140 and the moving average of the predicted life expectancy for a number of days, where an N-day moving average life expectancy is calculated as S/N, S is a sum of respective life expectancies predicted with LE model 140 for N days, $N \ge 2$.

The LE model 140 that had been determined as complete in block 350 would be a reverse graph, linear or non-linear. Exemplary LE model graphs determined as complete according to Conditions 1 through 4 are presented in FIG. 5 and corresponding description.

Figure 4:
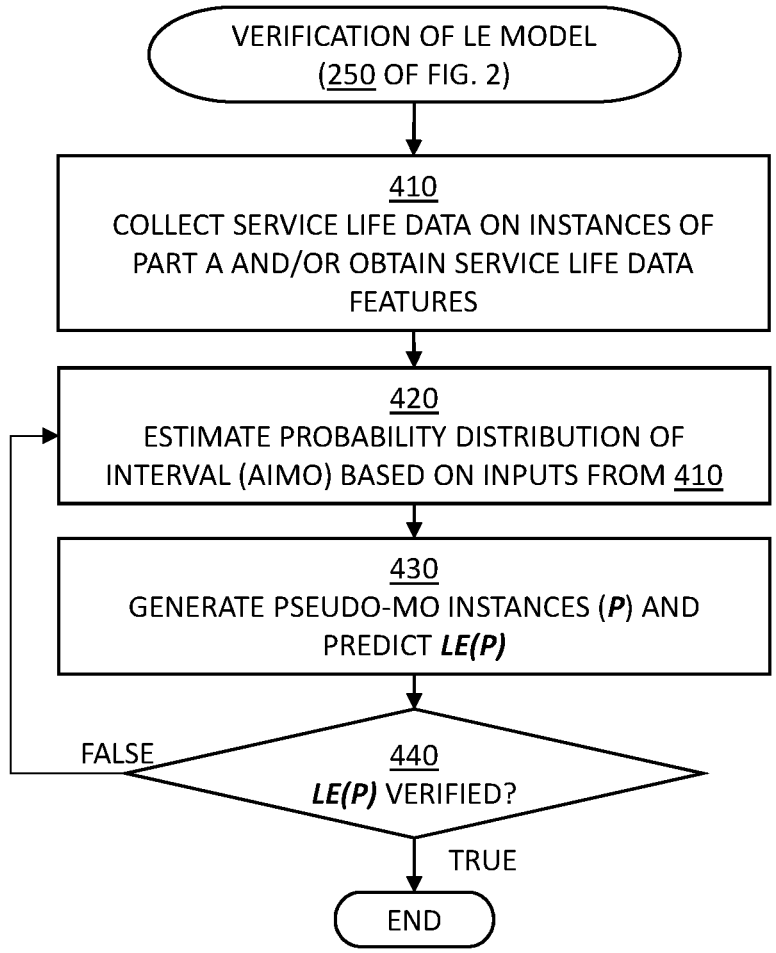
FIG. 4 depicts a flowchart of operations for verifying the LE model in block 250 performed by the life expectancy prediction engine, in accordance with one or more embodiments set forth herein.

FIG. 4 depicts a flowchart of operations for verifying the LE model 140 in block 250 performed by the life expectancy prediction engine 130, in accordance with one or more embodiments set forth herein.

In block 410, the life expectancy prediction engine 130 collects the service life data 119 on instances of the Part 115 and/or obtains probabilistic features of the service life data 119. Then the life expectancy prediction engine 130 proceeds with block 420.

In certain embodiments of the present invention, the life expectancy prediction engine 130 sets an observation period for collecting the service life data 119, and then collects the service life data 119 during the set observation period, in order to investigate the probabilistic features of the service life data 119. If the service life data 119 that had been previously collected but not expired are available, then the life expectancy prediction engine 130 obtains the probabilistic features from the previously collected service life data 119 without observation.

In block 420, the life expectancy prediction engine 130 estimates a heuristic probability distribution of intervals between two consecutive maintenance operations, based on inputs from block 410. The estimated probability distribution provides respective probabilities for a plurality of intervals, which can vary based on working environment of the Part 115. Accordingly, the estimated probability distribution also controls respective probabilities of maintenance operations. Then the life expectancy prediction engine 130 proceeds with block 430.

In certain embodiments of the present invention, the life expectancy prediction engine 130 investigates how the collected service life data 119 from block 410 fit to a probability density function such as a Poisson distribution or other categorical distribution, according to a constraint that the maintenance operations form a discrete distribution. The life expectancy prediction engine 130 then estimates the probability distribution according to probabilistic features shown in the service life data 119 and generates pseudo-independent parameters to input the estimated probability distribution for prediction using the LE model 140.

In block 430, the life expectancy prediction engine 130 generates pseudo-maintenance operation instances, respectively corresponding to a point in time during the life span of the part 115, and predicts respective life expectancies, based on the generated pseudo-maintenance operation instances and the intervals from block 420 by use of the LE model 140. Then the life expectancy prediction engine 130 proceeds with block 440.

In certain embodiments of the present invention, life expectancy prediction engine 130 generates the pseudo-maintenance operation instances randomly within the range of the observed life span of the Part 115. As noted, the intervals, AIMO, and the accumulated number of maintenance operations, MOMI=p, are independent variables by which the life expectancy, LE(p), is determined. By estimating the probability distribution of the intervals based on observed service life data 119, and by generating pseudo-maintenance operation counts for prediction, the life expectancy prediction engine 130 predicts the life expectancy LE(p) without collecting independent variables for a certain observation period.

The independent variables generated by the life expectancy prediction engine 130 presumably reflect a current operating environment in which the LE(p) is predicted, in terms of the accumulated number of maintenance operations at time p.

In block 440, the life expectancy prediction engine 130 verifies the predicted life expectancies by checking against the service life data 119 as observed until the time of prediction, where the time of prediction is measured in the number of accumulated maintenance operation, or the MOMI. The life expectancy prediction engine 130 verifies the predicted life expectancies in order to ensure that the prediction is reliable and that, consequently, the Part 115 can be reliably replaced at the replacement time based on the predicted life expectancy.

If the life expectancy prediction engine 130 successfully verifies the predicted life expectancy, LE(p), then the life expectancy prediction engine 130 proceeds with block 270 of FIG. 2. If the life expectancy prediction engine 130 fails to verify the predicted life expectancy, LE(p), then the life expectancy prediction engine 130 loops back to block 420 in order to estimate another probability distribution of the intervals.

In embodiments presented herein, the life expectancy prediction engine 130, using the estimated heuristic probability distribution from block 420, provides a result more accurate than predictions using a common probability distribution such as Poisson distribution. It had been observed that when actual exemplary record of alerts triggering various maintenance operations were 0.6%, 1.9%, 3.4%, 3.5%, and 1.0% for an anomaly of an inverter used in an engine of a crane, a halt of an encoder used in a controller of an engine, an occasion of overspeed that a crab trolley in a crane moves too fast, an occasion of overtime that a crab trolley takes more time than expected, and an occasion of overrun that a crab trolley goes beyond a target position, respectively. For the same maintenance operations, the LE model 140 using the estimated heuristic probability distribution predicts the respective maintenance operations as 0.7% (d=+0.1%), 2.2% (d=+0.3%), 4.2% (d=+0.8%), 3.8% (d=+0.3%), and 0.4% (d=−0.6%), respective to the types of the maintenance operations, while the LE model 140 using the Poisson distribution predicts the respective maintenance operations as 0.9% (d=+0.3%), 3.5% (d=+1.6%), 4.5% (d=+1.1%), 4.8% (d=+1.3%), and 1.4% (d=+0.4%), respectively, where d indicates difference between the actual record and the prediction.

Figure 5:
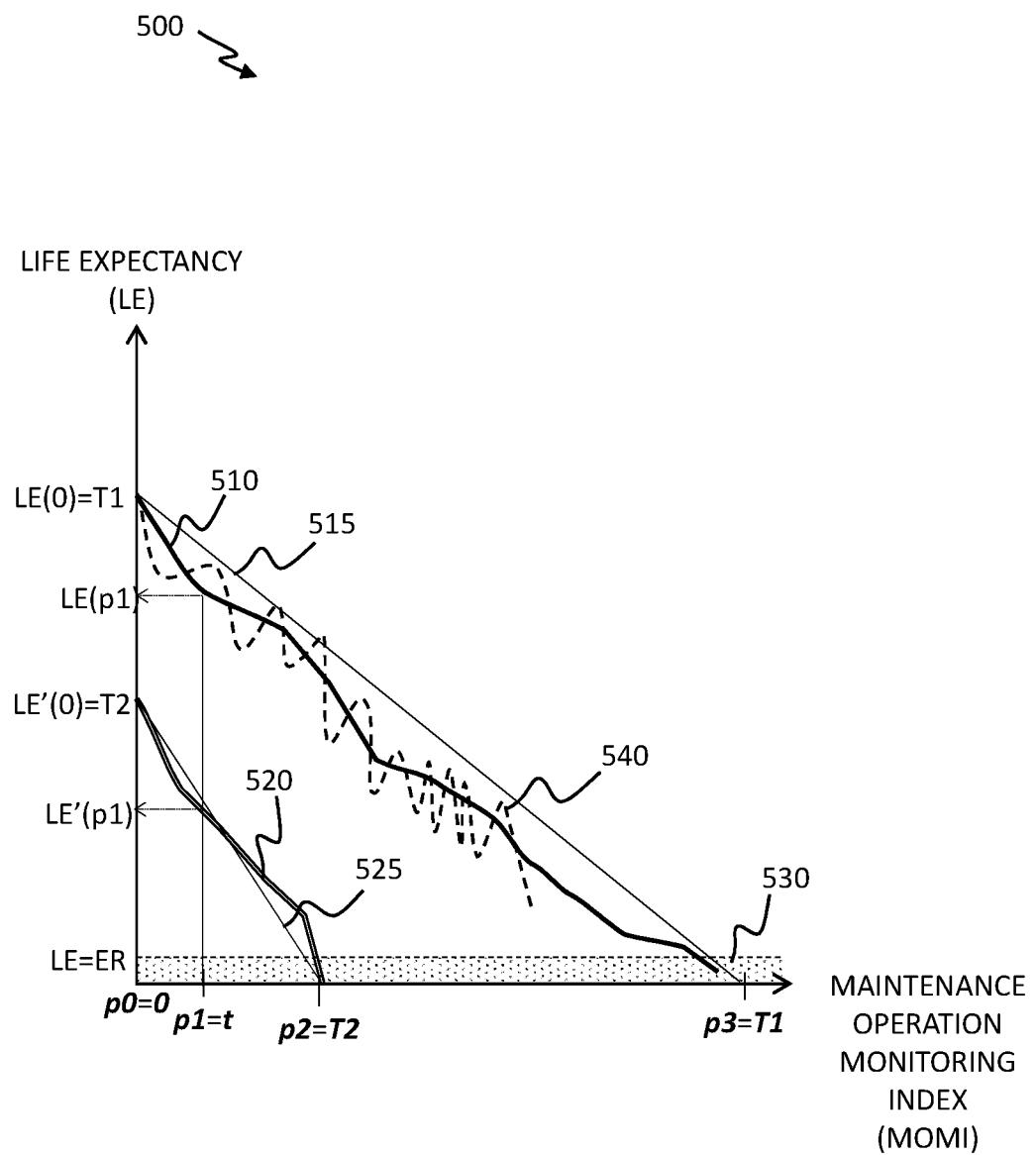
FIG. 5 depicts exemplary LE models determined as complete in block 350 of the life expectancy prediction engine, in accordance with one or more embodiments set forth herein.

FIG. 5 depicts exemplary LE models determined as complete in block 350 of the life expectancy prediction engine 130, in accordance with one or more embodiments set forth herein.

As noted, in this specification, the life span of the part 115 is measured as a total number of maintenance operations (T) for the part 115, and a point in time p, upon which a remaining life expectancy of the part 115 (LE(p)=T−MO(p)) is predicted, is measured as a number of accumulated maintenance operations MO(p), which is equal to the Maintenance Operation Monitoring Index (MOMI) In an x-y plane 500, the MOMI, or p, is on the x-axis, and life expectancy (LE) is on the y-axis.

A first LE curve 510 depicts a first life expectancy model LE of a part A. (0, LE(0)=T1) point on the y-axis indicates the life expectancy of the part A predicted at time p0=0, which is equal to a known life span (T1) of the part A based on previous observations. Because, at the beginning of the service life of the part A, no maintenance operation had not been monitored yet, (MOMI=p0=0), the remaining life expectancy would be equal to a known life span of the part A. The first LE curve 510 does not have neither positive nor zero gradient, and accordingly, the LE model is complete according to the Conditions 1 and 2 of block 350 of FIG. 3. Accordingly, the first LE curve 510 would be usable for predicting the remaining life expectancy, and consequently the replacement time, for the part A at any time (p1=t) during the period between the p0=0 and p3=T1, p0≤p1≤p3, which is represented by the point (p1, LE(p1)).

A first reverse linear graph 515 represents a reference gradient of the LE curve 510, representing that the life expectancy uniformly decreases reverse proportionally to the MOMI of the part A. (MOMI=p3=T1, 0) point on the x-axis indicates that the remaining life expectancy the part A would be zero (0) after the known life span of the part A (T1) has past.

A boundary (LE=ER) 530, and a shaded area delineated by the boundary 530, indicates the margin of error acceptable for the prediction (kσ) under the Condition 3 from block 350 of FIG. 3. Where the life expectancy prediction engine 130 predicts the remaining life expectancy less than or equal to ER, the remaining life expectancy can be treated as zero (0).

A fluctuating curve 540 represents noises observed in the moving average life expectancy around the first LE curve 510. If the differences between the first LE curve 510 and the noises fall within the noise threshold range, then the life expectancy prediction engine 130 determines that the first LE curve 510 is complete, according to the Condition 4 as set for the in block 350 of FIG. 3.

A second LE curve 520 depicts a second life expectancy model LE' of a part B. (0, LE'(0)=T2) point on the y-axis indicates the life expectancy of the part B predicted at time p0=0, which is equal to a known life span (T2) based on previous observations. Because, at the beginning of the service life of the part B, no maintenance operation had not been monitored yet, (MOMI=p0=0), the remaining life expectancy of the part B would be equal to a known life span of the part B. The second LE curve 520 does not have neither positive nor zero gradient, and accordingly, the LE' model is complete according to the Conditions 1 and 2 of block 350 of FIG. 3. Accordingly, the second LE curve 520 would be usable for predicting the remaining life expectancy of the part B, and consequently the replacement time for the part B at any time (p1=t) during the period between the p0=0 and p2=T2, p0≤p1≤p2, which is represented by the point (p1, LE'(p1)).

A second reverse linear graph 525 represents a reference gradient of the LE' curve 520, representing that the life expectancy would uniformly decrease reverse proportionally to the MOMI of the part B. (MOMI=p2=T2, 0) point on the x-axis indicates that the remaining life expectancy the part B would be zero (0) after the known life span of the part B (T2) has past.

The gradient of the first reverse linear graph 515 is less steep than the gradient of the second reverse linear graph 525, which is consistent with the Conditions 1 and 2 where a steeper gradient would be associated with a shorter life span.

Certain embodiments of the present invention can offer various technical computing advantages, including facilitating life expectancy prediction modeling even with limited amount of service life data for learning the relationship to be modeled, by complementing the lack of learning data by interpolating, estimating a probability distribution, and generating pseudo independent variables. Certain embodiments of the present invention present an extended bootstrap method to compensate the restriction with the amount of the service life data for learning, which estimates likely learning data based on the learning data according to a heuristic probability distribution shown in the observed service life data. Certain embodiments of the present invention can be implemented by use of a cloud platform/data center in various types including a Software-as-a-Service (SaaS), Platform-as-a-Service (PaaS), Database-as-a-Service (DBaaS), and combinations thereof based on types of subscription. The life expectancy prediction service can be provided for subscribed business entities in need from any location in the world.

Figure 6:
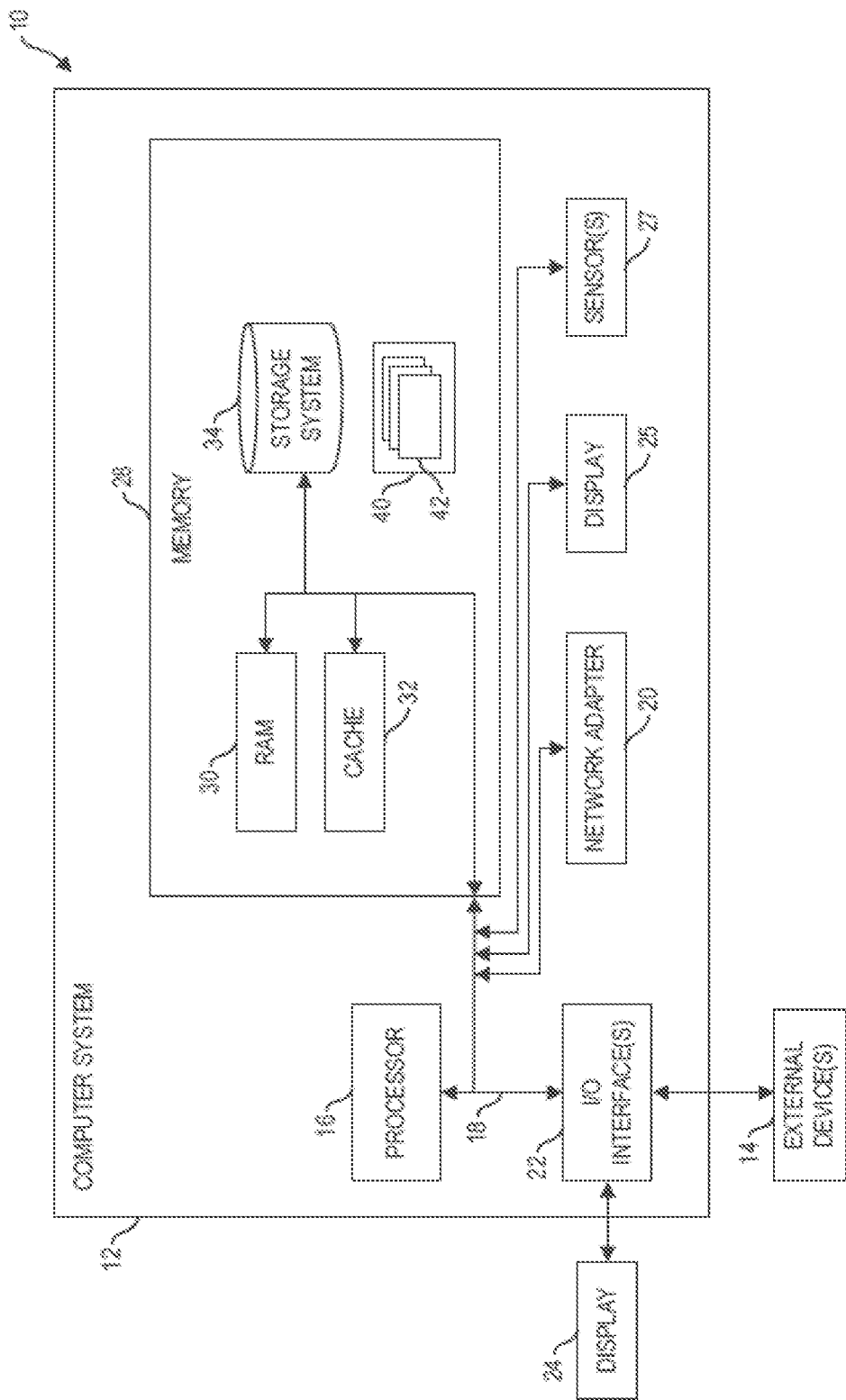
FIG. 6 depicts a cloud computing node according to an embodiment of the present invention.
Figure 7:
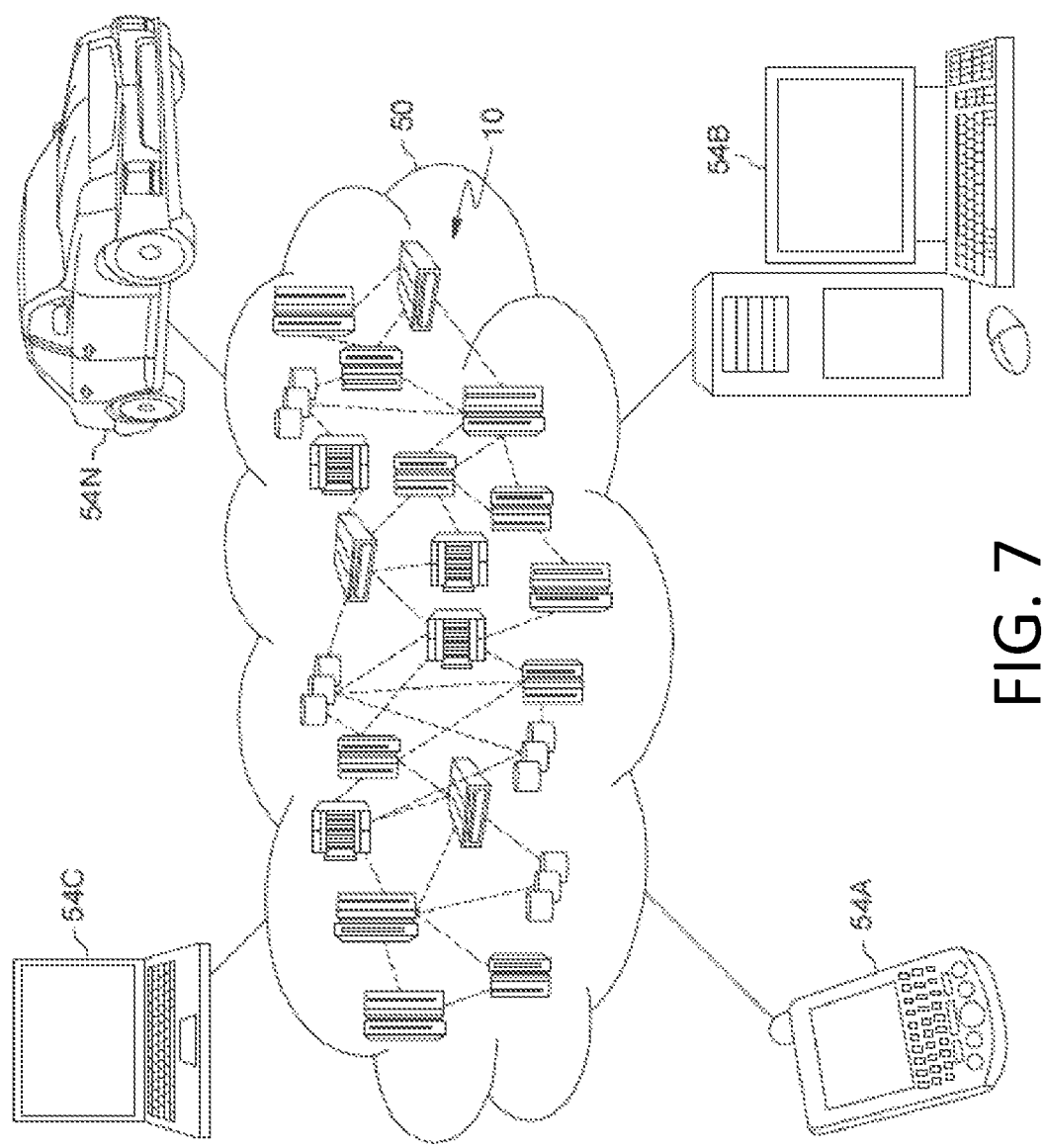
FIG. 7 depicts a cloud computing environment according to an embodiment of the present invention.
Figure 8:
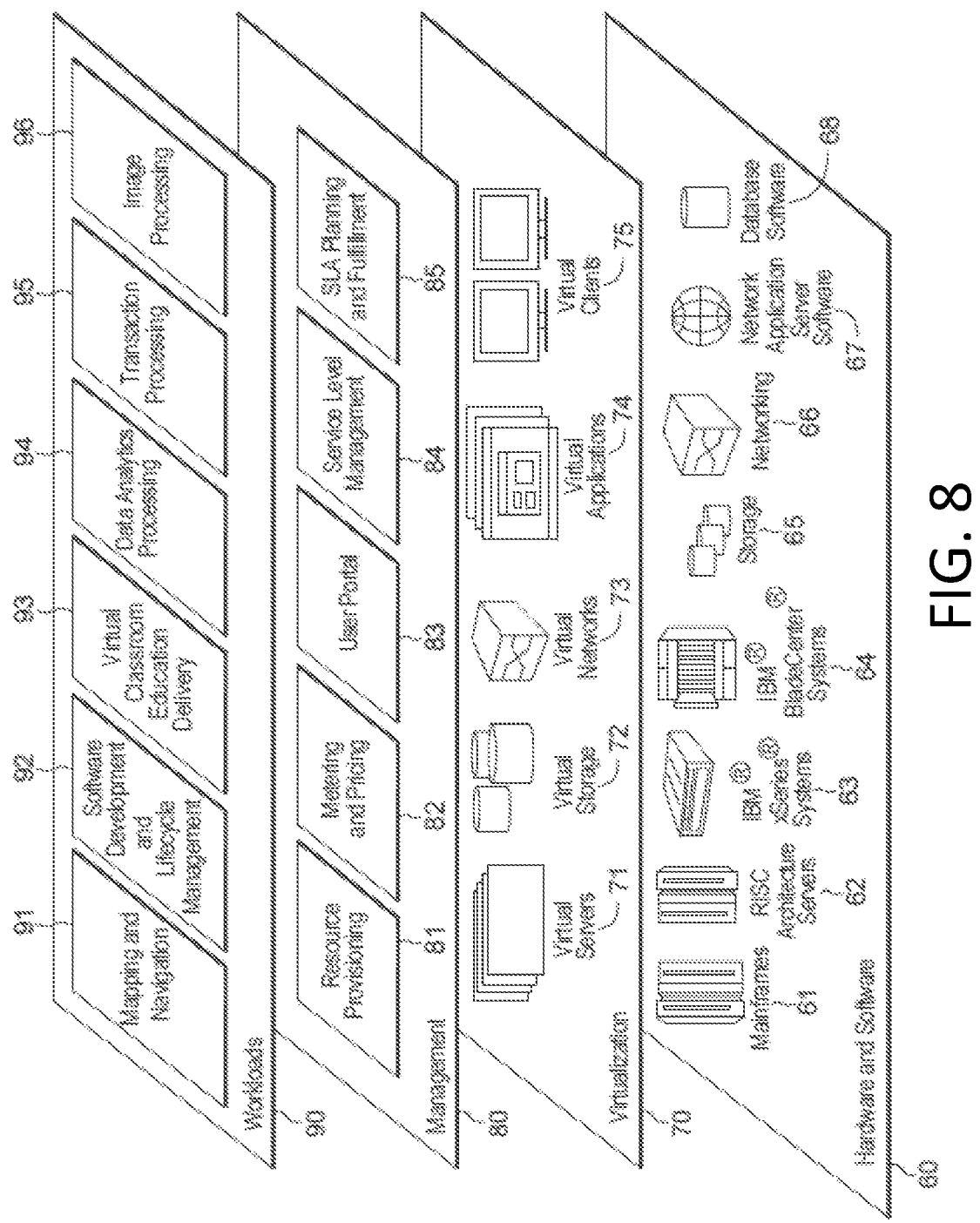
FIG. 8 depicts abstraction model layers according to an embodiment of the present invention.

FIGS. 6-8 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that can be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 can be described in the general context of computer system-executable instructions, such as program processes, being executed by a computer system. Generally, program processes can include routines, programs, objects, components, logic, data structures, and so on that perform particular tasks or implement particular abstract data types. Computer system 12 can be practiced in distributed cloud computing environments where tasks are performed by remote processing devices that are linked through a communications network. In a distributed cloud computing environment, program processes can be located in both local and remote computer system storage media including memory storage devices.

As shown in FIG. 6, computer system 12 in cloud computing node 10 is shown in the form of a general-purpose computing device. The components of computer system 12 can include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media can be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program processes that are configured to carry out the functions of embodiments of the invention.

One or more program 40, having a set (at least one) of program processes 42, can be stored in memory 28 by way of example, and not limitation, as well as an operating system, one or more application programs, other program processes, and program data. Each of the operating system, one or more application programs, other program processes, and program data or some combination thereof, can include an implementation of the life expectancy prediction engine 130 and the facility management system 120 of FIG. 1, respectively. Program processes 42, as in the life expectancy prediction engine 130 of the life expectancy prediction engine 130 system 120, generally carry out the functions and/or methodologies of embodiments of the invention as described herein.

Computer system 12 can also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and processing components for the life expectancy prediction services as provided by the facility management system 96, as described herein.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but can also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for predicting a life expectancy of a part, comprising:

obtaining, by one or more processor, service life data of the part, wherein the service life data include a maintenance operation count of the part;

creating, by the one or more processor, by use of a neural network, a life expectancy (LE) model predicting the life expectancy of the part as a function of first and second explanatory variables including an average interval between maintenance operations and the maintenance operation count at a point in time, based on the obtained service life data and the explanatory variables interpolated therefrom, comprising iteratively updating the LE model based on new learning data set until the LE model meets one or more completion criteria with respect to characteristics of a gradient of the LE model, a margin of error on prediction, and noise suppression;

verifying, by the one or more processor, the created LE model by comparing a plurality of life expectancies with observed service life data, wherein the life expectancies are predicted by the LE model based on simulated intervals and simulated maintenance operation counts, comprising iteratively updating the LE model based on newly collected service life data until the life expectancies predicted by LE model are within a margin of error acceptable for the prediction from the plurality of life expectancies in the newly collected service life data; and producing, by the one or more processor, the predicted life expectancy from the verifying for use, wherein the predicted life expectancy indicates when to replace the part in order to ensure a continuous operation utilizing the part.

2. The computer implemented method of claim 1, the creating comprising:

formulating the LE model predicting the life expectancy of the part at time p, denoted as LE(p), as T−MO(p), wherein T is a life span of the part, and MO(p) is the maintenance operation count at time p, and wherein LE(p) indicates the predicted life expectancy indicating a predicted remaining service life of the part at time p, in units of maintenance operations;

interpolating, based on the obtained service life data, intervals and additional maintenance operations, wherein the intervals indicate the average interval between two consecutive maintenance operations; and preparing learning data set including the interpolated intervals, the additional maintenance operations from the interpolating, and corresponding life expectancies based on the LE model from the formulating.

3. The computer implemented method of claim 2, further comprising:
building the LE model by use of the neural network;
ascertaining that the built LE model meets the one or more completion criteria with respect to characteristics of the gradient of the LE model, a margin of error acceptable for the prediction, and noise suppression; and
producing the LE model for use in future predictions for verification.

4. The computer implemented method of claim 3, wherein the one or more completion criteria includes: that the gradient of a curve representing the LE model decreases in a linear or non-linear manner; that the gradient of the curve shows neither a reverse flow nor a zero-gradient; that the curve is calculated within the margin of error acceptable for the prediction; and that the curve suppressed noises of the service life data.

5. The computer implemented method of claim 3, wherein the margin of error acceptable for the prediction ($k\sigma$) is determined by the standard deviation of the learning data set ($\sigma$) and by k according to $P(|LE(p)-LS|\leq k\sigma)\leq 1/k^2$, $k\geq 1$, P indicates a probability function, $LE(p)$ indicates a predicted life expectancy by use of the LE model for the part at time p, and LS indicates a life span of the part as observed from the service life data.

6. The computer implemented method of claim 1, the verifying comprising:
extracting probabilistic features of a service life of the part;
estimating a probability distribution of intervals based on the probabilistic features of the service life of the part, resulting in the simulated intervals;
generating pseudo maintenance operation instances, respectively corresponding to a point in time during the life span of the part, resulting in the simulated maintenance operation counts;
predicting the plurality of life expectancies by inputting the simulated intervals and the simulated maintenance operation counts to the LE model from the creating; and
ascertaining that the plurality of life expectancies from the predicting are within the margin of error acceptable for the prediction, based on checking the predicted plurality of life expectancies against another set of service life data.

7. The computer implemented method of claim 6, further comprising:
collecting, prior to the extracting, additional service life data in order to determine probabilistic features of a service life of the part.

8. A system comprising:
a memory;
one or more processor in communication with the memory; and
program instructions executable by the one or more processor via the memory to perform a method for predicting a life expectancy of a part, comprising:
obtaining service life data of the part, wherein the service life data include a maintenance operation count of the part;
creating, by use of a neural network, a life expectancy (LE) model predicting the life expectancy of the part as a function of first and second explanatory variables including an average interval between maintenance operations and the maintenance operation count at a point in time, based on the obtained service life data and the explanatory variables interpolated therefrom, comprising iteratively updating the LE model based on new learning data set until the LE model meets one or more completion criteria with respect to characteristics of a gradient of the LE model, a margin of error on prediction, and noise suppression;
verifying the created LE model by comparing a plurality of life expectancies with observed service life data, wherein the life expectancies are predicted by the LE model based on simulated intervals and simulated maintenance operation counts, comprising iteratively updating the LE model based on newly collected service life data until the life expectancies predicted by LE model are within a margin of error acceptable for the prediction from the plurality of life expectancies in the newly collected service life data; and
producing the predicted life expectancy from the verifying for use, wherein the predicted life expectancy indicates when to replace the part in order to ensure a continuous operation utilizing the part.

9. The system of claim 8, the creating comprising:
formulating the LE model predicting the life expectancy of the part at time p, denoted as $LE(p)$, as $T-MO(p)$, wherein T is a life span of the part, and $MO(p)$ is the maintenance operation count at time p, and wherein $LE(p)$ indicates the predicted life expectancy indicating a predicted remaining service life of the part at time p, in units of maintenance operations;
interpolating, based on the obtained service life data, intervals and additional maintenance operations, wherein the intervals indicate the average interval between two consecutive maintenance operations; and
preparing learning data set including the interpolated intervals, the additional maintenance operations from the interpolating, and corresponding life expectancies based on the LE model from the formulating.

10. The system of claim 9, further comprising:
building the LE model by use of the neural network;
ascertaining that the built LE model meets the one or more completion criteria with respect to characteristics of the gradient of the LE model, a margin of error acceptable for the prediction, and noise suppression; and
producing the LE model for use in future predictions for verification.

11. The system of claim 10, wherein the one or more completion criteria includes: that the gradient of a curve representing the LE model decreases in a linear or non-linear manner; that the gradient of the curve shows neither a reverse flow nor a zero-gradient; that the curve is calculated within the margin of error acceptable for the prediction; and that the curve suppressed noises of the service life data.

12. The system of claim 10, wherein the margin of error acceptable for the prediction ($k\sigma$) is determined by the standard deviation of the learning data set ($\sigma$) and by k according to $P(|LE(p)-LS|\leq k\sigma)\leq 1/k^2$, $k\geq 1$, P indicates a probability function, $LE(p)$ indicates a predicted life expectancy by use of the LE model for the part at time p, and LS indicates a life span of the part as observed from the service life data.

13. The system of claim 8, the verifying comprising:
extracting probabilistic features of a service life of the part;
estimating a probability distribution of intervals based on the probabilistic features of the service life of the part, resulting in the simulated intervals;

generating pseudo maintenance operation instances, respectively corresponding to a point in time during the life span of the part, resulting in the simulated maintenance operation counts;

predicting the plurality of life expectancies by inputting the simulated intervals and the simulated maintenance operation counts to the LE model from the creating; and ascertaining that the plurality of life expectancies from the predicting are within the margin of error acceptable for the prediction, based on checking the predicted plurality of life expectancies against another set of service life data.

14. The system of claim 13, further comprising: collecting, prior to the extracting, additional service life data in order to determine probabilistic features of a service life of the part.

15. A computer program product comprising: a computer readable storage medium readable by one or more processor and storing instructions for execution by the one or more processor for performing a method for predicting a life expectancy of a part, comprising:

obtaining service life data of the part, wherein the service life data include a maintenance operation count of the part;

creating, by use of a neural network, a life expectancy (LE) model predicting the life expectancy of the part as a function of first and second explanatory variables including an average interval between maintenance operations and the maintenance operation count at a point in time, based on the obtained service life data and the explanatory variables interpolated therefrom, comprising iteratively updating the LE model based on new learning data set until the LE model meets one or more completion criteria with respect to characteristics of a gradient of the LE model, a margin of error on prediction, and noise suppression;

verifying the created LE model by comparing a plurality of life expectancies with observed service life data, wherein the life expectancies are predicted by the LE model based on simulated intervals and simulated maintenance operation counts, comprising iteratively updating the LE model based on newly collected service life data until the life expectancies predicted by LE model are within a margin of error acceptable for the prediction from the plurality of life expectancies in the newly collected service life data; and producing the predicted life expectancy from the verifying for use, wherein the predicted life expectancy indicates when to replace the part in order to ensure a continuous operation utilizing the part.

16. The computer program product of claim 15, the creating comprising:

formulating the LE model predicting the life expectancy of the part at time p, denoted as LE(p), as T−MO(p), wherein T is a life span of the part, and MO(p) is the maintenance operation count at time p, and wherein LE(p) indicates the predicted life expectancy indicating a predicted remaining service life of the part at time p, in units of maintenance operations;

interpolating, based on the obtained service life data, intervals and additional maintenance operations, wherein the intervals indicate the average interval between two consecutive maintenance operations; and preparing learning data set including the interpolated intervals, the additional maintenance operations from the interpolating, and corresponding life expectancies based on the LE model from the formulating.

17. The computer program product of claim 16, further comprising:

building the LE model by use of the neural network;

ascertaining that the built LE model meets the one or more completion criteria with respect to characteristics of the gradient of the LE model, a margin of error acceptable for the prediction, and noise suppression; and producing the LE model for use in future predictions for verification.

18. The computer program product of claim 17, wherein the one or more completion criteria includes: that the gradient of a curve representing the LE model decreases in a linear or non-linear manner; that the gradient of the curve shows neither a reverse flow nor a zero-gradient; that the curve is calculated within the margin of error acceptable for the prediction; and that the curve suppressed noises of the service life data.

19. The computer program product of claim 17, wherein the margin of error acceptable for the prediction (kσ) is determined by the standard deviation of the learning data set (σ) and by k according to $P(|LE(p)-LS| \leq k\sigma) \leq 1/k^2$, $k \geq 1$, P indicates a probability function, LE(p) indicates a predicted life expectancy by use of the LE model for the part at time p, and LS indicates a life span of the part as observed from the service life data.

20. The computer program product of claim 15, the verifying comprising:

extracting probabilistic features of a service life of the part;

estimating a probability distribution of intervals based on the probabilistic features of the service life of the part, resulting in the simulated intervals;

generating pseudo maintenance operation instances, respectively corresponding to a point in time during the life span of the part, resulting in the simulated maintenance operation counts;

predicting the plurality of life expectancies by inputting the simulated intervals and the simulated maintenance operation counts to the LE model from the creating; and ascertaining that the plurality of life expectancies from the predicting are within the margin of error acceptable for the prediction, based on checking the predicted plurality of life expectancies against another set of service life data.

* * * * *